United States Patent [19]
Weigelt

[11] Patent Number: 5,174,011
[45] Date of Patent: Dec. 29, 1992

[54] METHOD FOR PREPARING THE ROTOR OF A TURBOGENERATOR

[76] Inventor: Klaus Weigelt, P.O. Box 1132, D-7897 Kadelburg, Fed. Rep. of Germany

[21] Appl. No.: 675,658

[22] Filed: Mar. 27, 1991

[51] Int. Cl.⁵ .............................................. H02K 15/14
[52] U.S. Cl. .................................. 29/598; 29/402.07; 29/402.08; 310/270; 310/271
[58] Field of Search ................. 29/596, 598, 402.06, 29/402.07, 402.08; 310/270, 271

[56] References Cited
U.S. PATENT DOCUMENTS
4,841,615 6/1989 Ratner ......................... 29/402.06 X

*Primary Examiner*—Carl E. Hall
*Attorney, Agent, or Firm*—Louis Weinstein

[57] ABSTRACT

A method of repairing the rotor showing tooth top cracking of a turbogenerator, wherein after removal of the rotor from the stator and of the existing retaining rings, the winding is protected with suitable cover materials, including sealing the whole with parafine, the entire shrink fit area is dry machined to an optimized geometry, the machined area is deburred, and after removal of the burrs and the covering and sealing material new retaining rings are fitted. The main advantage is the possibility to carry out the method on site.

18 Claims, 3 Drawing Sheets

Fig. 5a
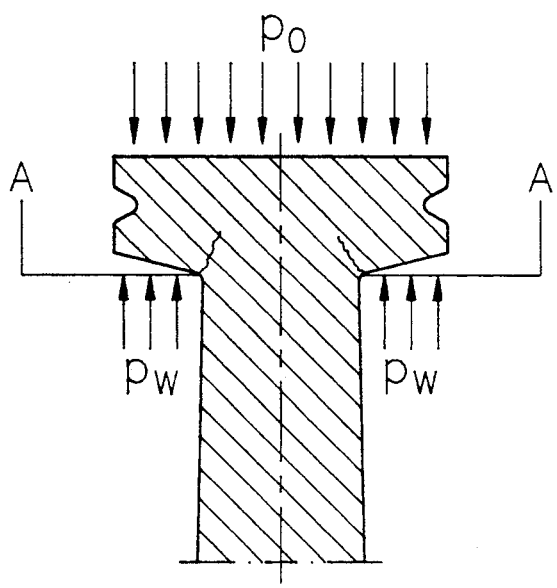
Fig. 5b
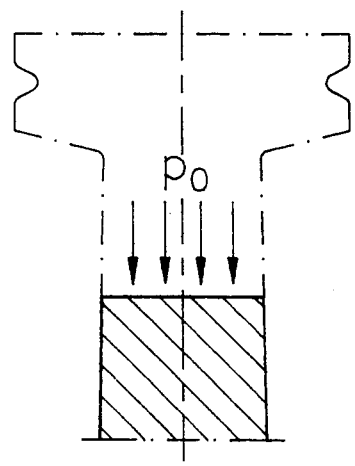
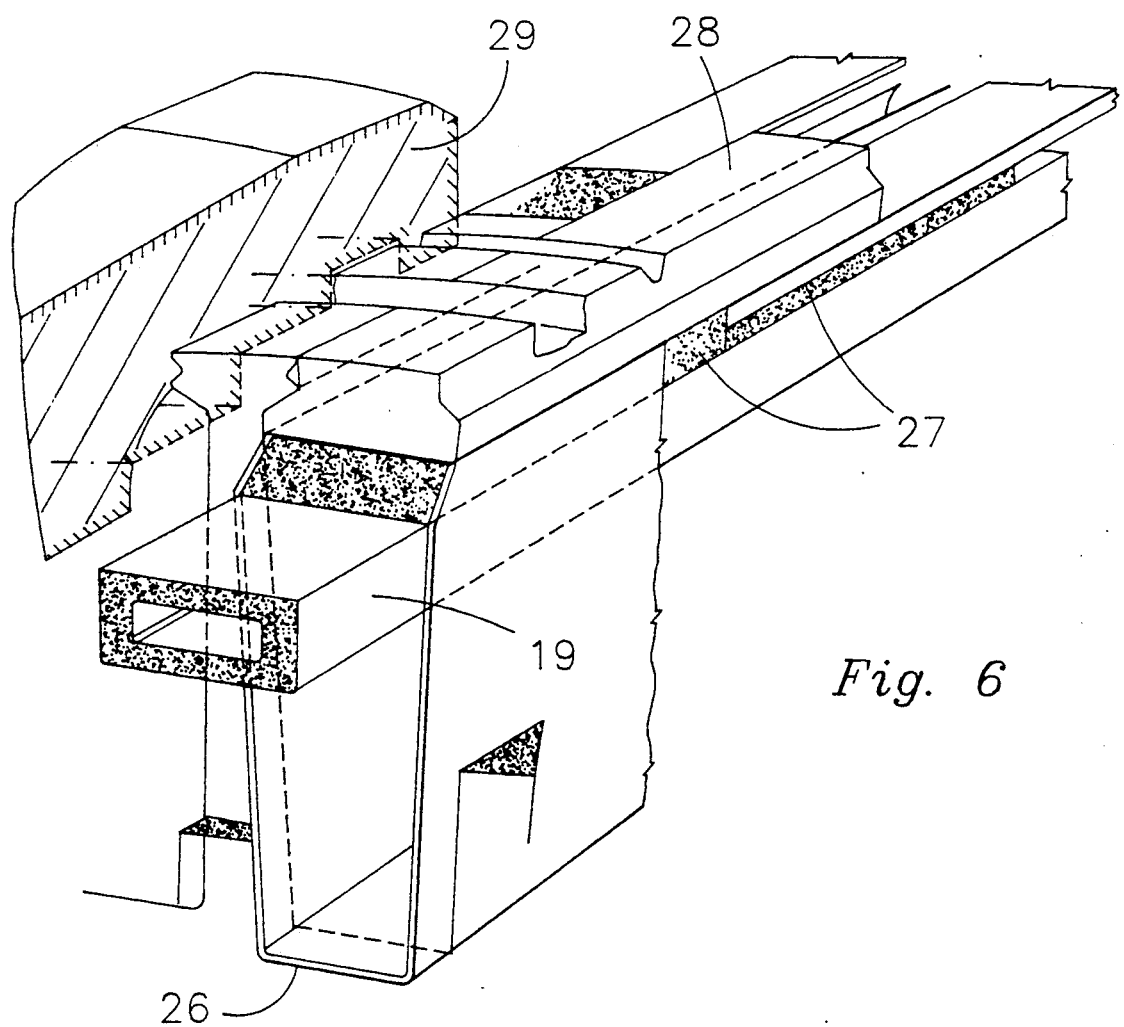
Fig. 6

METHOD FOR PREPARING THE ROTOR OF A TURBOGENERATOR

BACKGROUND OF THE INVENTION

1. Field of the Invention

The present invention relates to a method for repairing the rotor of a turbogenerator showing at least in part a tooth top cracking, said rotor bearing windings lodged in a great number of axially extending rotor slots, whereby said windings are insulated against the slot walls by so-called slot-cells, the rotor being furthermore provided with retaining rings axially held by ring keys or the like and retaining the rotor end windings against rotational forces and being shrink fitted onto the rotor ends.

2. Description of the Prior Art

Turbogenerators installed in power plants use retaining rings to contain the rotor end windings against rotational forces (FIG. 1 and FIG. 2). Thousands of the retaining rings which are currently in service were fabricated from the nonmagnetic austenitic steel 18Mn5Cr or from magnetic steel. Because this steel is susceptible to stress corrosion cracking and several failures with extended outage times have already happened, electric utilities are starting more and more to change to a new retaining ring steel 18Mn18Cr which is not susceptible to stress corrosion cracking.

Parallel to this, older power plants are being used increasingly for peak-load generation. For the turbogenerator, which was originally designed as a base load machine, this change in type of operation leads to increased fatigue loading of the rotor body and the retaining rings. These rotors have a few hundred to several thousands start/stop cycles. On several generator rotors upper sections of the rotor teeth have broken off between the tooth end and the groove of the ring key which holds the retaining ring axially (FIG. 2, FIG. 4 and FIG. 6). The teeth were broken off as a result of high fatigue load. Broken off teeth can cause serious problems in operation. This problem is called the tooth top cracking problem.

Such rotors with cracks in the rotor teeth must normally be brought back to the factory of a generator manufacturer for repair. Such a repair in general requires today also a complete rewind of the rotor. Long outage times for the power plant are the consequence. Because this repair requires also new retaining rings with different dimensions, this opportunity can also be used to replace the 18Mn5Cr retaining rings by 18Mn18Cr retaining rings. This increases additionally the reliability of a turbo-generator.

Retaining rings have to withstand different forces acting in a complicated manner. The most important forces are the centrifugal and the shrink-fit forces.

The centrifugal forces, that are generated by the ring itself and by the load of the end winding acting in the ring bore, lead to hoop stresses. Especially at 20% overspeed (test pit operation) the retaining rings are thereby highly stressed over their entire length.

The pressure of the rotor end winding (FIG. 2) in the ring bore tends to prevent any relative axial displacement of the retaining ring and end winding by developing a frictional force. Poisson contraction in the retaining ring and the thermally induced displacement of retaining ring and end winding lead therefore to axial forces in the retaining rings. Due to these forces axial stresses arise in the shrink-fit area, particularly at any transition, (see FIG. 3) where a change in bore diameter occurs. The shrink forces are greatest at standstill, and decrease with increasing speed. They also lead to hoop stresses. In addition an axial force can be produced between the usual radial shrink-fit and the ring key or the retaining ring lugs. Thus, axial stresses act also at rest.

Due to the centrifugal and shrink-fit forces hoop stresses and axial stresses are acting simultaneously especially in the shrink-fit area.

The change in stress level from standstill to full load particularly in the transition areas, represents the fatigue stress range under start/stop conditions. This fatigue loading is an important aspect to be taken into account in lifetime analysis.

Simultaneously improved manufacturing methods have become available providing an increased freedom in the selection of the ring geometry without additional costs.

As a result an optimized form of the ring and the teeth could be selected providing a considerably reduced stress level in the shrink-fit area. A drop of the fatigue stress range can thereby be achieved and accordingly the lifetime can be increased. The optimal design for the shrink-fit area on the rotor body and for the retaining ring will result from a stress analysis or lifetime analysis.

An increasing number of large new power stations, and in particular nuclear power stations, are being commissioned. Since these are being used predominantly for baseload operation, older fossil-fired power stations are being used increasingly for peak-load generation. For the turbogenerator, which was originally designed as a baseload machine, this change in type of operation leads to increased fatigue loading of the rotor body and retaining rings. In order to make an accurate condition evaluation, the cyclic stresses must be known.

A distinction is drawn between two types of cyclic operation:

Load cycling

Two-shift operation

During load cycling the rotor remains at the nominal speed of rotation and the load is altered between 30% and 100% depending on the grid conditions. The alteration of the load is performed in a generator by alteration of the stator current. The stator current induces eddy current losses in the retaining rings. These eddy currents are highest in the region of the shrink-fit between the retaining ring and the rotor body, since the separation (air gap) here from the stator winding is smallest. Since the eddy current losses in the retaining ring and in the rotor body lead to heating, and this in turn to thermal stresses, load-dependent stress changes are to be expected in the region of the shrink-fit during load cycling. These load-dependent stress changes should be taken into account in a lifetime analysis, particularly if in addition an increase of generator ouput is planned.

For load changes the excitation current is also altered. Changes in the excitation current cause an alteration of the winding temperature. The related expansion of the winding generates frictional forces which lead to additional axial forces on the retaining ring. Hereby stress changes arise once more in the shrink-fit region.

If the load sinks to less than 30% of the nominal value then the turboset is generally removed from the grid and put on turning gear operation until it is next required.

This type of operation is also known as two-shift operation. The changes in rotational speed cause strong variations in the radial and axial forces on the retaining rings.

Depending on the design of the shrink-fit area larger or smaller stress variations will occur.

Normally the stress changes occuring during load cycling do not lead to any problems, provided that the coefficient of friction between the winding head and the retaining ring is sufficiently small, and provided that no very large output increases are planned for older units. But design changes where the retaining rings move further into the air gap caused by the machined tooth tops must be investigated for acceptable eddy current losses. However in two-shift operation difficulties may easily arise if the design is unsuitable. This applies particularly for older generators which were designed as baseload machines but which are to be used in future for two-shift operation.

Hence it is strongly recommended that such retaining rings and rotor bodies should be checked within the framework of a lifetime analysis.

Since, as mentioned above, retaining rings and rotor body are most highly loaded during two-shift operation, and this type of operation determines their lifetime, only the stress changes for this type of operation will be discussed in the following.

The transition areas of the shrink-fit generate higher stress levels. This effect is particularly pronounced at sharp transitions.

At the most highly stressed points cracks can be nucleated as a result of low cycle fatigue and subsequently propagate further. A further possible cause of cracking is stress corrosion. Due to the danger of crack initiation, and in particular crack propagation, the fatigue stresses must be known. The fatigue stresses must be determined for the design under consideration. Axisymmetric Finite-Element models are usually used to calculate the stress levels. The stress field in the shrink-fit area shows however a strongly 3-dimensional behaviour, due to the presence of the slots in the rotor body (see FIG. 2, FIG. 4 and FIG. 5). In order to deal with the complex stress field behaviour, 3-dimensional Finite-Element models of that area are also used. Thus, the stress levels in the retaining ring are accurately known at every rotational speed. As a consequence the inspection intervals can be prescribed and it is possible to make an estimate of defect sizes which must be sought.

Clearly, designs with sharp transitions must be investigated more closely. In particular older ring-key designs were made with sharp transition radii (FIG. 3). Cracks can propagate from these transitions. As a result it is necessary to make an exact determination of the cyclic stress taking into account all forces (in order to avoid unpleasant surprises later on). Due to differences in machining tolerances and due to the coefficients of thermal expansion the uniform destribution of the force is not always ensured. One-sided loads can lead to high stress concentrations as a result of the sharp radii.

The new designs should therefore be provided with sufficiently large transition radii (FIG. 3) so that stress concentration effects remain within reasonable limits.

For a better understanding of the invention, the following is a brief description of the cyclic loading of the rotor teeth in the shrink-fit region: The rotor teeth provide the opposing part to the retaining ring in the vicinity of the shrink-fit. In two-shift operation the rotor teeth are cyclically loaded, just as for the retaining ring.

Peak stresses at the transition areas (FIG. 3) of rotor teeth are to be minimized by appropriate design. As a result of intensively high stresses, low cycle fatigue cracks can nucleate at these points and subsequently grow until the teeth are broken off (FIG. 4).

The importance of this consideration is emphasized by several failures which have already occured. In two-shift operation rotor teeth were broken off as a result of high fatigue loads. The loads experienced by a rotor tooth are shown in FIGS. 5a and 5b). The positions of the crack nucleation are also indicated.

At standstill the shrinkage pressure $p_o$ caused compressive stresses in the notches A. At the nominal speed of rotation the shrinkage pressure $p_o$ became smaller so that the compressive stresses were also reduced. In addition a pressure $p_w$, due to the centrifugal force of the windings, acted at the nominal speed. This effect exerted in turn tensile stresses in the notches A. In this way the stresses were altered in the tensile direction. Both loading changes, the reduction of the shrinkage pressure and the increase of the winding centrifugal force, generated a positive stress change in the notches A. This cyclic stress can be so large that within approximately 800 start/stop cycles cracks nucleated at the notches and propagated through the teeth until they broke off. By selecting a more suitable geometry for the shrink fit area it is possible to overcome this problem. FIG. 5b shows how on existing rotors the shrink fit area can be modified. Different locking systems for the retaining rings like ring keys or bayonets are possible.

SUMMARY OF THE INVENTION

Accordingly, it is a general object of the present invention to provide a method for repairing the rotor of a turbogenerator without rewinding and without the very expensive necessity of transporting the rotor to the factory for complete revision, and machining the rotor ends.

To this end the method according to the invention proposes the following steps:
   removing the rotor from the stator;
   removing the retaining rings;
   cutting the slot-cells in the areas to the rotor to be machined, if necessary;
   covering the rotor windings with suitable cover materials and tapes and sealing the whole with parafine or the like in preparation for dry machining;
   dry machining the entire shrink-fit area to: thereby eliminate all cracked portions of the teeth; to obtain an optimized geometry; and machining grooves for a new retaining ring locking system;
   deburring the machined areas;
   removing all burrs;
   removing the sealing material and the protection covers;
   inserting additional U-channels between the slot walls and the remaining slot-cells for reinforcement, if necessary;
   locking the sandwich slot cells against axial movement;
   installing of new end-wedges for the slots;
   and finally installing new retaining rings dimensioned according to the optimized geometry of the rotor ends; and
   electrical tests before and after repair.

BRIEF DESCRIPTION OF THE DRAWINGS

The invention will be better understood and objects other than that set forth above will become apparent when consideration is given to the following detailed description thereof. Such description makes reference to the drawings illustrating the problems encountered in connection with the present invention.

FIGS. 5a and 5b illustrate the load on original and machined rotor tooth heads; and FIG. 6 illustrates schematically a detail of a shrink fit area and rotor slot.

DESCRIPTION OF THE PREFERRED EMBODIMENT

Figure 1:
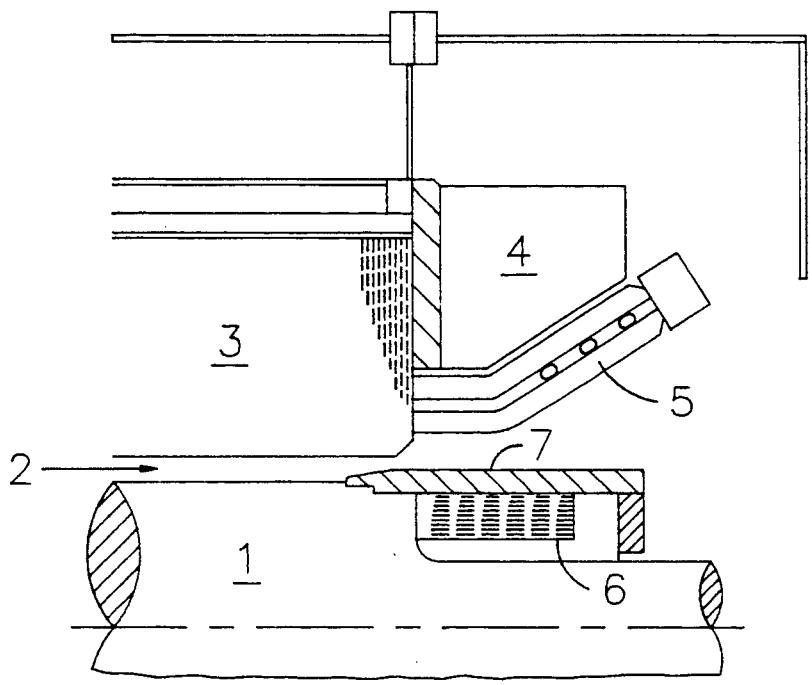
FIG. 1 illustrates schematically an end section of a turbogenerator.

FIG. 1 of the drawings shows purely schematically a turbogenerator, comprising a rotor body 1, an air gap 2, a stator core 3, stator end-winding support 4, stator end-winding 5, rotor end-winding 6 and a rotor retaining ring 7.

Figure 2:
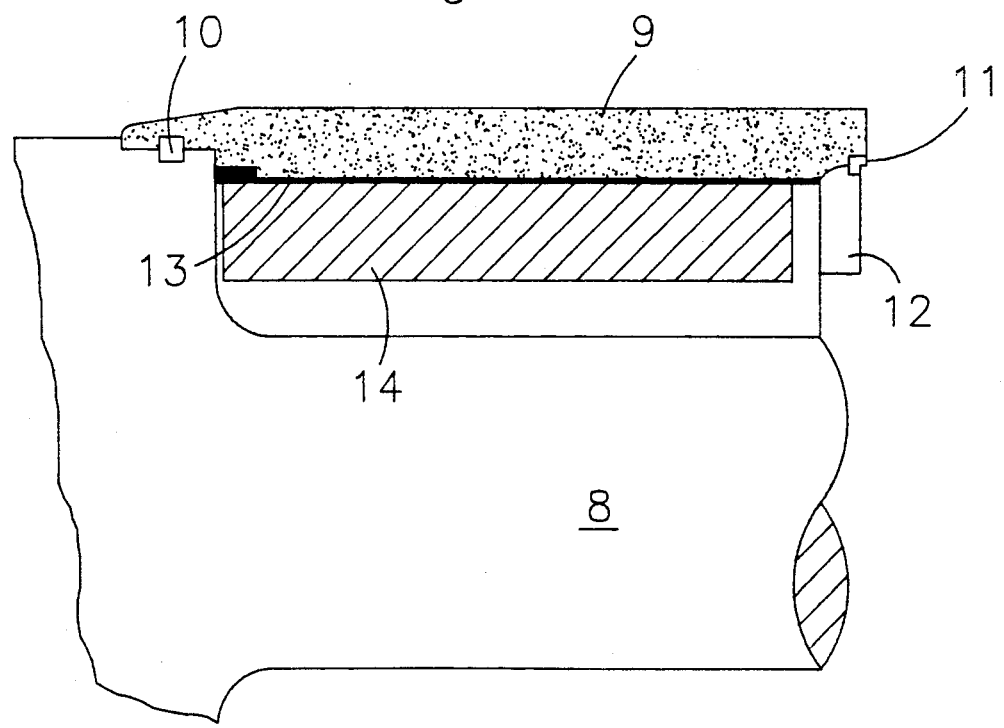
FIG. 2 illustrates a schematic section through a typical retaining ring assembly.

FIG. 2 illustrates a section through a typical retaining ring assembly, with a rotor 8, retaining ring 9, ring keys 10,11, an end plate or centering ring 12, an insulating liner 13 and the end turns 14 of the field winding.

Figure 3:
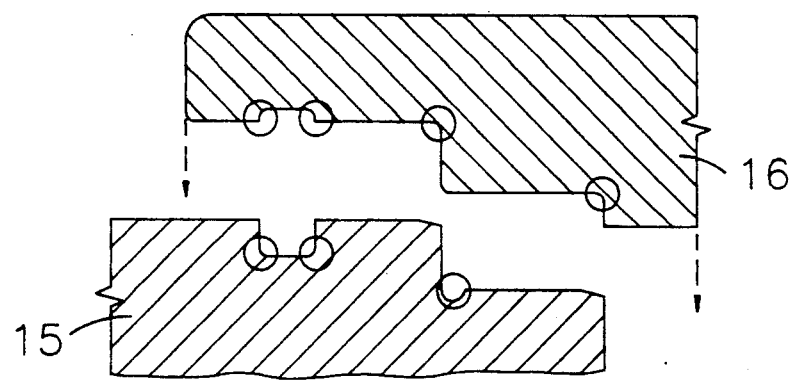
FIG. 3 is showing a typical example of transition areas in the shrink-fit region of retaining rings and rotor teeth.

FIG. 3 illustrates schematically a part of a rotor tooth 15 and a retaining ring 16, with the typical transition areas in the shrink fit region of the retaining ring and rotor tooth (in small circles).

Figure 4:
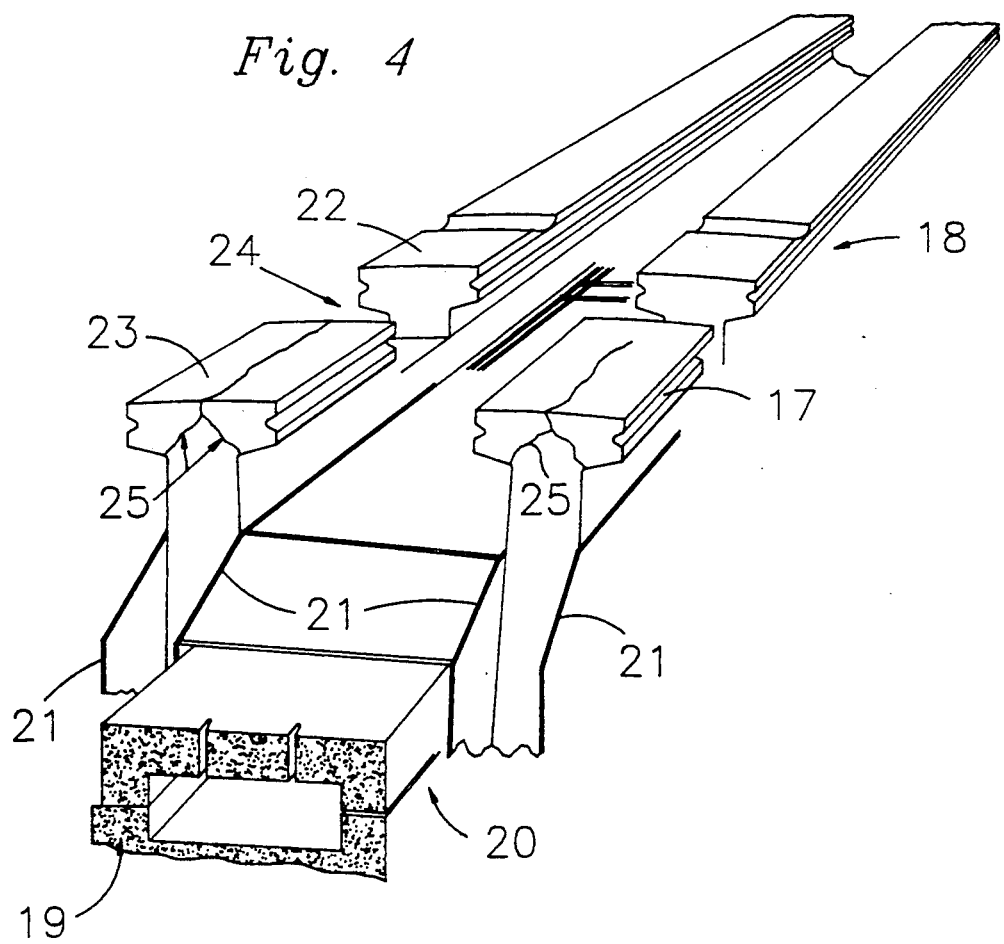
FIG. 4 illustrates a part of the shrink fit area with cracked rotor tooth heads.

FIG. 4 illustrates a shrink fit area with cracked rotor tooth heads 17 on rotor 18. The figure shows a rotor coil or winding 19 placed in a rotor slot 20 embedded in a slot insulation (slot cell) 21. The figure illustrates the retaining ring in board fit area 22, the retaining ring fit area 23 and a groove 24 for the ring key 10 (see FIG. 2). The teeth are shown as having cracks 25 in the rotor tooth heads 17.

As will be explained hereinafter, after machining of the cracked tooth heads (FIG. 5b) the locking system (groove of the ring key or bayonet) moves further into the air gap (see also FIG. 1, FIG. 2 and FIG. 6). The optimized geometry of the shrink fit and the retaining ring results from a finite element calculation.

FIGS. 5a and 5b show schematically the load on the rotor tooth heads on both an original tooth head and a machined tooth head. $P_o$ illustrates the shrinkage pressure and $p_w$ the pressure due to centrifugal forces of the windings.

FIG. 6 illustrates a shrink fit area and rotor slot in more detail. The end of each rotor slot containing the turns of the winding 19 enclosed by a so-called slot cell insulation 26 is closed at the outer open end by creepage blocks 27 and end-wedges 28. The retaining ring 29 retains the end winding 25.

If the original slot cell is e.g., a glass-epoxy-mica slot cell it will be reinforced by a Nomex slot cell in the area of the shrink fit (sandwich composition). Therefore the thin short Nomex U-channel will be installed between the existing slotliner and the slot walls. The U-channels can be glued to the existing slotliner and to the slot wall. This sandwich composition can then be locked to avoid axial movement, for example, with a copper piece which is brazed to the winding on the slot end. The stresses of the insulation are thus reduced.

For machining of the tooth head and the retaining ring locking system, the original slot cells must be protected and if necessary cut out. The locking system for the retaining rings moves then further into the air gap (i.e. the new retaining ring will be axially longer).

Description of a preferred method for repairing the rotor of a turbogenerator:

In the introductory part the forces and stresses to the rotor teeth and the retaining rings under cyclic operation were described. As already mentioned many generator rotors in operation are not designed for the requirements of cyclic operation. If such generator rotors are operated under cyclic conditions, cracks can be initiated in the rotor teeth and in the retaining rings, experience shows. Now a repair procedure will be described which allows an optimization of the rotor teeth and of the retaining rings in the shrink fit area without rewinding the rotor. This helps electric utilities to reduce outage times, costs and improve reliability and availability of power plants. The necessary work can also be performed on site if, for example, a portable lathe is available.

The repair procedure sequence is, e.g. as follows:

optimization of the rotor teeth and retaining ring geometry in the shrink fit area by a finite element analysis (life time analysis) for cyclic operation (see FIG. 4);

analysis of the eddy current losses in the retaining rings and optimizing retaining ring surface;

replacement of the old 18Mn5Cr retaining rings by new 18Mn18Cr or other retainig rings with the optimized geometry on the transition areas and on the retaining ring surface;

inspection of the 18Mn18Cr or other retaining rings by ultrasonic and/or dye penetrant methods to avoid overspeeding;

Machining of the new retaining rings according to the optimized geometry;

removal of the 18Mn5Cr retaining rings and end-wedges;

Cut out of the slot cells in the machining area with a special tool if necessary (see FIG. 5b);

protection of the end-winding and of the slot portion with plastics and Nomex layers during machining of the shrink-fit area. Fixation of these layers with tapes;

sealing of the surfaces with parafine. The parafine has to seal all clearances between the protection covers and the end-winding in the slot portion of the end-wedges and the winding overhang;

dry machining of the rotor body on the shrink-fit area. Removal of cracked T-heads and machining of a new ring-key groove or bayonet locking system according optimized geometry;

deburring of the machined areas;

removal of all burrs with magnets;

removal of parafine;

removal of protection covers;

installation of thin U-channels for reinforcement in addition to the existing slot cells in the shrink-fit area. The U-channels can be glued to the existing U-channels (sandwich) and to the slot wall;

locking of the sandwich slot cells against axial movement;

installation of new retaining ring insulation;
installation of new end-wedges;
installation of new retaining rings; and finally
electrical tests before and after repair.

Because of the modern inspection methods of retaining rings, on overspeed test is not necessary. Every removed end-wedge will be replaced in such a way that no unbalance will be brought into the rotor. Because of this and because the retaining-rings are cylindrical elements no running problems are to be expected during operation.

The following repeats the most important steps in the inventive repair procedure (repair without rewinding the rotor):
removal of the rotor from the turbogenerator;
removal of existing retaining rings;
protecting the winding with suitable cover materials including sealing with parafine or the like;
dry machining the entire shrink fit area to an optimized geometry.
deburring the machined area;
removal of the covering and sealing material; and
fitting new retaining rings.

While there are shown and described preferred embodiments of the invention, it is to be distinctly understood that the invention is not limited thereto, but may otherwise be variously embodied and practiced within the scope of the following claims.

I claim:

1. A method for repairing the rotor of a turbogenerator showing at least in part a tooth top cracking, said rotor extending into a cooperating stator and having windings lodged in a great number of axially extending rotor slots and having slot walls whereby said windings are insulated from the slot walls by slot-cells, the rotor being furthermore provided with retaining rings axially held by ring keys and containing the rotor end windings and being shrink fitted onto the rotor ends, the repairing method comprising the steps of:
removing the rotor from the turbogenerator;
removing the retaining rings;
protecting the rotor windings with cover materials and tapes and sealing the rotor windings with paraffine in preparation for dry machining;
cutting out the slot-cells in the later machining area where necessary;
dry machining at least the shrink-fit area to be engaged by the retaining rings to eliminate all cracked portions of the teeth;
machining grooves in the rotor for receipt of a new retaining ring locking system;
deburring the machined areas;
removing all burrs;
removing the sealing material and the protection covers;
locking the slot cells against axial movement;
installing new end-wedges for the slots;
installing new retaining rings dimensioned according to the optimized geometry of the rotor ends; and
performing electrical tests before and after repair of the rotor.

2. A repair method according to claim 1, wherein the step of installing new retaining rings includes providing retaining rings formed of 18Mn18Cr.

3. A repair method according to claim 1, wherein the step of installing new end-wedges further comprises the step of providing end-wedges of identical weight to thereby avoid the need for balancing of the repaired rotor.

4. A repair method according to claim 1, wherein the repair is performed at the site of the turbogenerator and without rewinding the rotor.

5. The method of claim 1 further comprising the step of reinforcing existing slot cells in the shrink fit area of the retaining rings without removal of the rotor winding.

6. The method according to claim 1, further comprising the step of locking a sandwich composite comprising old slotliners and additional protecting channels against axial movement, preferably by brazing a copper piece to the top turns of the rotor winding.

7. The method according to claim 1, further comprising the step of optimizing the geometry of the new retaining rings to reduce eddy current heating and mechanical cyclic stresses.

8. The method according to claim 5 further comprising the step of locking a sandwich composite comprising old slot liners and additional protecting channels against axial movement, preferably by brazing a copper piece to the top turns of the rotor winding.

9. The method according to claim 5 further comprising the step of optimizing the geometry of the new retaining rings to reduce eddy current heating and mechanical cyclic stresses.

10. The method of claim 2 further comprising the step of providing end-wedges of identical weight to thereby avoid balancing of the repaired rotor.

11. The method according to claim 1 further comprising the step of inserting additional U-channels between the slot walls and the remaining slot-cells for reinforcement.

12. The method of claim 5 wherein the step of reinforcing the slot cell further comprises the step of inserting a reinforcing slot cell between said existing slot cell and said slot walls.

13. The method of claim 12 further comprising the step of gluing the reinforcing slot cell to the existing slot cell and the slot walls.

14. The method of claim 1 further comprising the step of brazing a copper piece to the rotor winding to prevent axial movement of the existing and reinforcing slot cells.

15. The method of claim 1 further comprising the step of filling the region between the top of the rotor winding and the retaining ring with creepage blocks and end-wedges.

16. The method of claim 1 wherein the step of removing burrs comprises employing magnetic means to remove the burrs.

17. A method for repairing the rotor of a turbogenerator showing at least in part a tooth top cracking, said rotor being arranged in a stator and having windings lodged in a great number of axially extending rotor slots each having slot walls, whereby said windings are insulated against the slot walls by slot-cells, the rotor being furthermore provided with retaining rings axially held by ring keys and containing the rotor end windings and being shrink fitted onto the rotor ends, the repair method comprising the steps of:
removing the rotor from the turbogenerator;
removing the rotor retaining rings;
protecting the rotor winding with cover materials including sealing the winding with paraffine;

dry machining the shrink fit area to be engaged by the retaining rings to remove the cracked tooth portions;

deburring the machined area;

removing the covering and sealing materials; and fitting new retaining rings upon the rotor.

18. The method of claim 17 further comprising the step of forming the interior surface of the retaining rings adjacent to and covering the teeth to fill the region previously occupied by the removed teeth portions.

* * * * *

UNITED STATES PATENT AND TRADEMARK OFFICE
CERTIFICATE OF CORRECTION

PATENT NO. :  5,174,011

DATED :  December 29, 1992

INVENTOR(S) :  Klaus Weigelt

It is certified that error appears in the above-identified patent and that said Letters Patent is hereby corrected as shown below:

Column 3, line 59, change "destribution" to --distribution--

Column 6, line 35, change "retainig" to --retaining--

Column 6, line 58, after "according" insert --to the--

Signed and Sealed this

Second Day of November, 1993

Attest:

BRUCE LEHMAN

Attesting Officer

Commissioner of Patents and Trademarks